United States Patent [19]

Raulfs et al.

[11] Patent Number: 5,663,386
[45] Date of Patent: Sep. 2, 1997

[54] METHOD FOR MARKING MINERAL OILS WITH AMTHRAQUINONES

[75] Inventors: Friedrich-Wilhelm Raulfs, Ludwigshafen; Christos Vamvakaris, Kallstadt, both of Germany

[73] Assignee: BASF Aktiengesellschaft, Ludwigshafen, Germany

[21] Appl. No.: 513,871

[22] PCT Filed: Mar. 7, 1994

[86] PCT No.: PCT/EP94/00673

§ 371 Date: Sep. 18, 1995

§ 102(e) Date: Sep. 18, 1995

[87] PCT Pub. No.: WO94/21752

PCT Pub. Date: Sep. 29, 1994

[30] Foreign Application Priority Data

Mar. 18, 1993 [DE] Germany .................. 43 08 643.9

[51] Int. Cl.⁶ .................................. C09B 1/16
[52] U.S. Cl. .................. 552/241; 552/200; 552/240; 552/242
[58] Field of Search .................... 552/200, 240, 552/241, 242

[56] References Cited

U.S. PATENT DOCUMENTS 1,898,953  2/1933  Grossmann .
3,164,449  1/1965  Buxbaum .

*Primary Examiner*—Kimberly J. Prior
*Assistant Examiner*—Lily Ledynh
*Attorney, Agent, or Firm*—Oblon, Spivak, McClelland, Maier & Neustadt, P.C.

[57] ABSTRACT

The invention discloses the use of anthraquinones of the formula

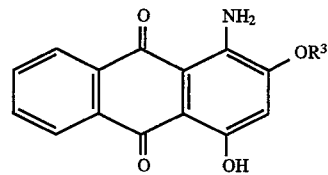

where $R^3$ is unsubstituted or substituted $C_1$–$C_{18}$-alkyl or unsubstituted or substituted phenyl for marking mineral oils. Also disclosed are the marked mineral oils and a method of detecting the anthraquinones in mineral oils.

5 Claims, No Drawings

METHOD FOR MARKING MINERAL OILS WITH AMTHRAQUINONES

This application is a 371 of PCT/EP94/00673, filed Mar. 7, 1994, published as WO94/21752, Sep. 29, 1994.

The present invention relates to the use of anthraquinones of the formula Ia

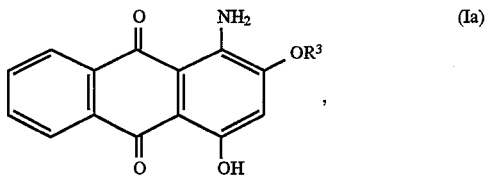

where $R^3$ is $C_1$–$C_{18}$-alkyl which is unsubstituted or substituted by hydroxyl, cyano or phenyl and may be interrupted by from 1 to 3 ether oxygen atoms or from 1 to 3 N-($C_1$–$C_4$-alkyl)-imino groups or is phenyl which is unsubstituted or substituted by $C_1$–$C_4$-alkyl, hydroxyl, $C_1$–$C_4$-alkoxy, ($C_1$–$C_4$-mono- or dialkylcarbamoyl)-$C_1$–$C_4$-alkoxy or $C_1$–$C_8$-mono- or dialkylsulfamoyl, where the alkyl groups may be interrupted by from 1 to 3 ether oxygen atoms, for marking mineral oils, mineral oils marked with the abovementioned anthraquinones, and dye mixtures containing an oil-soluble dye and an abovementioned anthraquinone.

The present invention furthermore relates to a method of detecting anthraquinones of the formula Ib

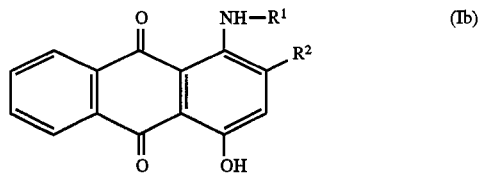

$R^1$ is hydrogen, $C_1$–$C_{18}$-alkyl which is unsubstituted or substituted by cyano, or phenyl which is unsubstituted or substituted by $C_1$–$C_4$-alkyl, hydroxyl or $C_1$–$C_4$-alkoxy, and $R^2$ is hydrogen or a radical of the formula X—$R^3$, where X is oxygen or sulfur and $R^3$ has the abovementioned meanings, in mineral oils by treating the latter with an aqueous alkaline medium.

EP-A-147 704 and EP-A-149 125 disclose 1,4-dihydroxyanthraquinones which have a substituted amino group in the ring position 2 as markers for mineral oils. However, it has been found that the compounds stated there have unsatisfactory performance characteristics. Thus, they exhibit, for example, insufficient stability to alkalis.

U.S. Pat. No. 3,164,449 discloses dye mixtures comprising N-substituted 1-hydroxy-4-aminoanthraquinones, suitable substituents being hexadecyl, octadecyl, octadecenyl and octadecadienyl. These dye mixtures, like the anthraquinones mentioned in GB-A-552 882, are used as dyes for dyeing mineral oils. There is no indication of the use as markers in either of these documents.

It is an object of the present invention to provide novel agents for marking mineral oils. The novel agents should be easily obtainable and readily soluble in mineral oils. Moreover, they should be capable of being detected in a simple manner. Even very small amounts of marker should be capable of being rendered visible by a strong color reaction. Finally, the marker should have good stability in the alkaline detection reaction.

We have found that this object is achieved and that the anthraquinones of the formula Ia which are defined at the outset are advantageous for marking mineral oils.

All alkyl radicals occurring in the abovementioned formulae Ia and Ib may be either straight-chain or branched.

If substituted alkyl groups occur in the abovementioned formulae Ia and Ib, they have, as a rule, 1 or 2 substituents.

If phenyl groups occur in the abovementioned formulae Ia and Ib, they have, as a rule, from 1 to 3 substituents.

$R^1$ and $R^3$ are each, for example, methyl, ethyl, propyl, isopropyl, butyl, isobutyl, sec-butyl, pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, 3,5,5,7-tetramethylnonyl, isotridecyl (the above names isooctyl, isononyl, isodecyl and isotridecyl are trivial names and originate from the alcohols obtained by the oxo synthesis, cf. Ullmanns Encyklopädie der technischen Chemie, 4th Edition, Volume 7, pages 215 to 217, and Volume 11, pages 435 and 436), tetradecyl, pentadecyl, hexadecyl, heptadecyl, octadecyl, cyanomethyl, 2-cyanoethyl, 2- or 3-cyanopropyl, 2- or 4-cyanobutyl, 5-cyanopentyl, 6-cyanohexyl, phenyl, 2-, 3-or 4-methylphenyl, 2-, 3- or 4-ethylphenyl, 2,4-dimethylphenyl, 2-, 3- or 4-hydroxyphenyl, 2,4-dihydroxyphenyl, 2-, 3- or 4-methoxyphenyl, 2-, 3- or 4-ethoxyphenyl or 2,4-dimethoxyphenyl.

$R^3$ may furthermore be, for example, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 2-hydroxyethyl, 2-hydroxypropyl, 3-hydroxypropyl, 2-hydroxybutyl, 4-hydroxybutyl, 5-hydroxypentyl, 6-hydroxyhexyl, 5-hydroxy-3-oxapentyl, benzyl, 1-phenylethyl, 2-phenylethyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 2-dimethylaminoethyl, 2-diethylaminoethyl, 2- or 3-dimethylaminopropyl, 2- or 3-diethylaminopropyl, 2- or 4-dimethylaminobutyl, 2- or 4-diethylaminobutyl, 3,6-dimethyl-3,6-diazaheptyl, 3,6,9-trimethyl-3,6,9-triazadecyl, 2-(1-methoxyethoxy)ethyl, 2-(1-ethoxyethoxy)ethyl, 2-(1-isobutoxyethoxy)ethyl, 2- or 3-(1-methoxyethoxy)propyl, 2- or 3-(1-ethoxyethoxy) propyl, 2- or 3-(1-isobutoxyethoxy)propyl, 4-mono- or dimethylsulfamoylphenyl, 4-mono- or diethylsulfamoylphenyl, 4-mono- or dipropylsulfamoylphenyl, 4-mono- or diisopropylsulfamoylphenyl, 4-mono- or dibutylsulfamoylphenyl, 4-(mono-3-oxabutylsulfamoyl) phenyl, 4-(mono-3-oxapentylsulfamoyl)phenyl, 4-(mono-4-oxapentylsulfamoyl)phenyl, 4-(mono-4-oxahexylsulfamoyl)phenyl, 3-mono- or dimethylcarbamoylmethoxyphenyl, 3-mono- or diethylcarbamoylmethoxyphenyl, 3-(2-mono- or dimethylcarbamoylethoxy)phenyl or 3-(2-mono-or diethylcarbamoylethoxy)phenyl.

Anthraquinones of the formula Ib, where $R^2$ is hydrogen or a radical of the formula $OR^3$, in which $R^3$ has the abovementioned meanings, are preferably detected in mineral oils.

Anthraquinones of the formula Ib, where $R^1$ is hydrogen or $C_1$–$C_{18}$-alkyl or is phenyl which is unsubstituted or substituted by $C_1$–$C_4$-alkyl, hydroxyl or $C_1$–$C_4$-alkoxy and $R^2$ is hydrogen, are particularly preferably detected in mineral oils.

Anthraquinones of the formula Ib, where $R^1$ is hydrogen and $R^2$ is a radical of the formula $OR^3$, in which $R^3$ has the abovementioned meanings, are furthermore particularly preferably detected in mineral oils.

The detection of anthraquinones of the formula Ib, where $R^1$ is hydrogen, $C_1$–$C_4$-alkyl phenyl or methylphenyl and $R^2$ is hydrogen, in mineral oils is very particularly noteworthy.

The detection of anthraquinones of the formula Ib, where $R^1$ is hydrogen and $R^2$ is $C_1$–$C_4$-alkoxy or phenoxy, mineral oils is furthermore very particularly noteworthy.

The use of anthraquinones of the formula Ia, where $R^3$ is $C_1$–$C_4$-alkyl or phenyl, for marking mineral oils is furthermore very particularly noteworthy.

The present invention furthermore relates to mineral oils containing one or more of the anthraquinones of the formula Ia.

For the purposes of the present invention, mineral oils are to be understood as meaning, for example, power fuels, such as gasoline, kerosene or diesel oils, or oils, such as fuel oil or engine oil.

The anthraquinones of the formula Ia are particularly suitable for marking mineral oils for which identification is required, for example for tax reasons. In order to keep the costs of identification low, it is desirable to use very small amounts of marker.

In order to mark mineral oil, anthraquinones of the formula Ia are used either as such or in the form of solutions. Preferred solvents are aromatic hydrocarbons, such as toluene, xylene, dodecylbenzene, diisopropylnaphthalene or a mixture of higher aromatics, which is commercially available under the name Shellsol® AB (from Shell). Further cosolvents, for example alcohols, such as methanol, ethanol, propanol, isopropanol, butanol, isobutanol, pentanol, hexanol, heptanol, octanol, 2-ethylhexanol or cyclohexanol, glycols, such as butylethylene glycol or methylpropylene glycol, amines, such as triethylamine, diisooctylamine, dicyclohexylamine, aniline, N-methylaniline, N,N-dimethylaniline, toluidine or xylidene, alkanolamines, such as 3-(2-methoxyethoxy)propylamine, o-cresol, m-cresol or p-cresol, ketones, such as diethyl ketone or cyclohexanone, lactams, such as γ-butyrolactone, carbonates, such as ethylene carbonate or propylene carbonate, phenols, such as tert-butylphenol or nonylphenol, esters, such as methyl phthalate, ethyl phthalate, 2-ethylhexyl phthalate, ethyl acetate, butyl acetate or cyclohexyl acetate, amides, such as N,N-dimethylformamide, N,N-diethylacetamide or N-methylpyrrolidone, or mixtures thereof, can usually be used for improving the solubility. In order to avoid a high viscosity of the resulting solutions, a concentration of anthraquinone Ia of from 1 to 50, preferably from 10 to 50, % by weight, based in each case on the solution, is generally chosen.

The present invention furthermore relates to dye mixtures containing an oil-soluble dye and an anthraquinone of the formula Ia.

The novel dye mixtures are advantageously prepared and used in the form of solutions. Preferred solvents are the abovementioned products. However, in order to avoid an excessively high viscosity of the resulting solutions here too, the abovementioned concentrations of dye are also chosen.

The anthraquinones of the formula Ia and the oil-soluble dye are advantageously dissolved in a weight ratio of from 10:1 to 1:10 in solvents. In principle, the ratio can of course be completely freely chosen. The novel mixtures may contain one or more oil-soluble dyes and one or more anthraquinones of the formula Ia.

Oil-soluble dyes for the novel mixtures are, for example, the compounds which are stated under Solvent Dyes in the Color Index and which may originate from various dye classes. The choice of the oil-soluble dyes depends on the desired hue. Representative examples of oil-soluble dyes are the dyes of the formulae II to IX:

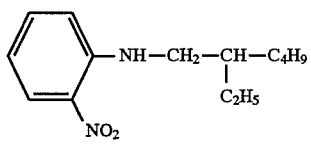
(II) Yellow

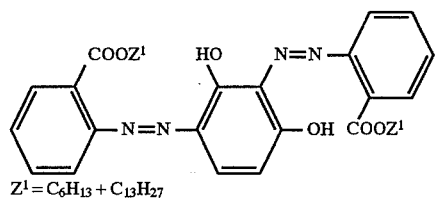
$Z^1 = C_6H_{13} + C_{13}H_{27}$
(III) Yellow

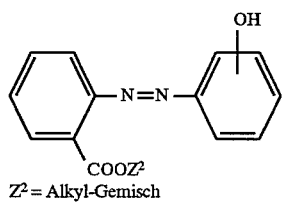
$Z^2$ = Alkyl-Gemisch
(IV) Orange

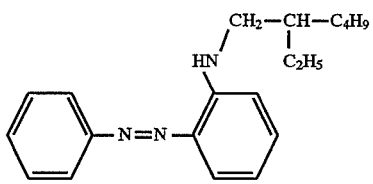
(V) Orange

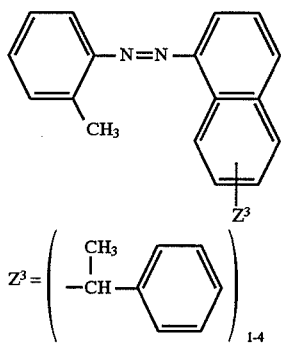
(VI) Red

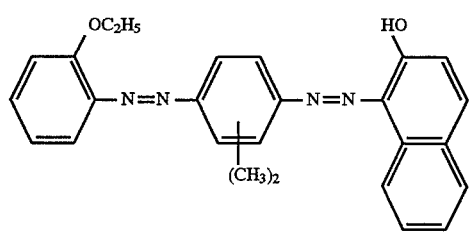
(VII) Red

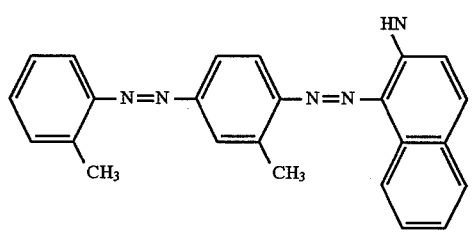
$Z^4 = C_8H_{17} + C_{13}H_{27}$
(VIII) Red

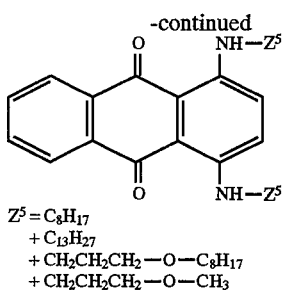

$Z^5 = C_8H_{17}$
+ $C_{13}H_{27}$
+ $CH_2CH_2CH_2-O-C_8H_{17}$
+ $CH_2CH_2CH_2-O-CH_3$

Further suitable oil-soluble dyes are, for example, C.I. Solvent Yellow 14 (12,055), C.I. Solvent Yellow 16 (12,700), C.I. Solvent Yellow 56 (11,021), C.I. Solvent Orange 102, C.I. Solvent Red 1 (12,150), C.I. Solvent Red 19, C.I. Solvent Red 24 (26,105), C.I. Solvent Red 215 or C.I. Solvent Blue 35 (61,554).

The novel mixtures have the advantage that they are suitable for coloring mineral oils so that they are readily visible and at the same time can be used as marking substances.

By means of the anthraquinones of the formula Ia which are to be used according to the invention, it is possible to detect marked mineral oils in a very simple manner even when the marking substances are present only in a concentration of about 10 ppm or lower. This also applies when the novel dye mixtures are used.

As stated at the outset, the anthraquinones of the formula Ib which are used as markers can be advantageously detected if the mineral oil is treated with an aqueous alkaline medium.

When an aqueous alkaline medium is added to the marked mineral oil, the result is a clearly visible color reaction with formation of a complex, the latter passing over into the aqueous phase.

Suitable aqueous alkaline media for the detection reaction are in particular aqueous solutions of alkali metal carbonates or alkali metal hydroxides, for example aqueous sodium carbonate or potassium carbonate solutions or sodium hydroxide or potassium hydroxide solutions. The content of alkali metal carbonate or alkali metal hydroxide in the aqueous solution is as a rule from 1 to 10% by weight, based on the weight of the solution.

In some cases, it may also be advantageous to add solubilizers, eg. N-methylpyrrolidone, methanol, ethanol, propanol, 1-methoxypropan-2-ol, glycerol, ethylene glycol, diethylene glycol, nonylphenol or water-miscible amines, for example alkanolamines, such as diethanolamine or triethanolamine, to the aqueous alkaline medium in minor amounts (in general up to 20%).

The anthraquinones of the formulae Ia and Ib are known per se. They are dispersion dyes for coloring or printing textiles. Examples are C.I. Disperse Red 4 (60,755), C.I. Disperse Red 15 (60,710), C.I. Disperse Blue 22 (60,715), C.I. Disperse Violet 13 (60,725) or C.I. Disperse Violet 27 (60,724). Further information may be obtained from, for example, K. Venkataraman, The Chemistry of Synthetic Dyes, Vol. 2, page 805, or Vol. 3, pages 391 to 396.

The anthraquinones which are to be used according to the invention can be detected in a simple manner in mineral oils. They exhibit high alkali stability in the detection reaction taking place in an alkaline medium.

The Examples which follow illustrate the invention.

EXAMPLE 1

100 ml of mineral oil which contains 10 ppm of 1-amino-2-methoxy-4-hydroxyanthraquinone was thoroughly shaken with 5 ml of a mixture of 10% strength by weight sodium hydroxide solution and N-methylpyrrolidone (5:1 v/v). The lower aqueous phase became violet while the organic phase was decolorized.

After standing for two days at room temperature, 95% of the dye complex were still present in the aqueous phase, as shown by photometric measurements.

The anthraquinones shown in the Table below can be detected in a similar manner.

| Example no. | Marker | Color of the aqueous phase |
|---|---|---|
| 2 | (anthraquinone with $NH_2$, $OC_6H_5$, $OH$ substituents) | violet |
| 3 | (anthraquinone with $NH_2$, $OH$ substituents) | violet |
| 4 | (anthraquinone with $NH-C_6H_4-CH_3$, $OH$ substituents) | blue |

| Example no. | Marker | Color of the aqueous phase |
|---|---|---|
| 5 | 1-methylamino-4-hydroxyanthraquinone | violet |
| 6 | 1-phenylamino-4-hydroxyanthraquinone | blue |
| 7 | 1-amino-2-[4-(N-(3-propoxypropyl)sulfamoyl)phenoxy]-4-hydroxyanthraquinone | blue |
| 8 | 1-amino-2-[4-(N-(3-ethoxypropyl)sulfamoyl)phenylthio]-4-hydroxyanthraquinone | blue |

We claim:

1. A method of using an anthraquinone to mark a mineral oil, comprising the steps of:

adding to a mineral oil an anthraquinone in an amount insufficient to produce a color reaction of the following general formula Ia

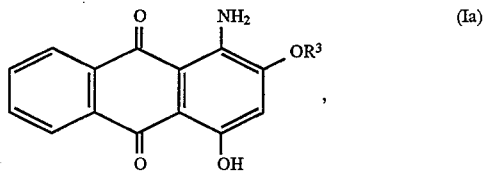

wherein $R^3$ is $C_1$–$C_{18}$-alkyl which is unsubstituted or substituted by hydroxyl, cyano or phenyl and may be interrupted by from 1 to 3 ether oxygen atoms or from 1 to 3 N-($C_1$–$C_4$-alkyl)-imino groups or is phenyl which is unsubstituted or substituted by $C_1$–$C_4$-alkyl, hydroxyl, $C_1$–$C_4$-alkoxy, ($C_1$–$C_4$-mono- or dialkyl carbamoyl)-$C_1$–$C_4$-alkoxy or $C_1$–$C_8$-mono- or dialkylsulfamoyl, where the alkyl groups may be interrupted by from 1 to 3 ether oxygen atoms; and subsequently detecting the presence of said anthraquinone by admixing a strong alkaline medium in order to effect a strong color reaction with said anthraquinone.

2. The method of claim 1, wherein $R^3$ is $C_1$–$C_4$-alkyl or phenyl.

3. The process of claim 1, wherein said amount of said anthraquinone is 10 ppm or less.

4. A composition, comprising a mineral oil and one or more anthraquinones of the formula Ia

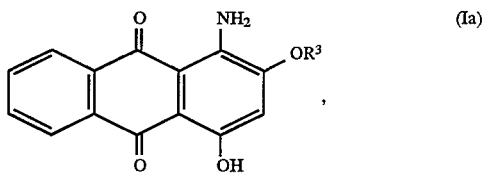

wherein $R^3$ is $C_1$–$C_{18}$-alkyl which is unsubstituted or substituted by hydroxyl, cyano or phenyl and may be interrupted by from 1 to 3 ether oxygen atoms or from 1 to 3 N-($C_1$–$C_4$-alkyl)-imino groups or is phenyl which is unsubstituted or substituted by $C_1$–$C_4$-alkyl, hydroxyl, $C_1$–$C_4$-alkoxy, ($C_1$–$C_4$-mono- or dialkyl carbamoyl)-$C_1$–$C_4$-alkoxy or $C_1$–$C_8$-mono- or dialkylsulfamoyl, where the alkyl groups may be interrupted by from 1 to 3 ether oxygen atoms;

said anthraquinone is present in an amount insufficient to produce a strong color reaction in said mineral oil; and said anthraquinone is subsequently detected by the admixture of a strong alkaline medium in order to effect a strong color reaction with said anthraquinone.

5. The composition of Claim 4, wherein said amount of said anthraquinone is 10 ppm or less.

* * * * *

UNITED STATES PATENT AND TRADEMARK OFFICE
CERTIFICATE OF CORRECTION

PATENT NO. : 5,663,386
DATED : September 2, 1997
INVENTOR(S) : Friedrich-Wilhelm RAULFS, et al.

It is certified that error appears in the above-indentified patent and that said Letters Patent is hereby corrected as shown below:

On the title page, item [54], and on top of column 1, AMTHRAQUINONES should be:

--ANTHRAQUINONES--

Signed and Sealed this

Second Day of December, 1997

*Attest:*

BRUCE LEHMAN

*Attesting Officer*     Commissioner of Patents and Trademarks